3,179,637
POLYETHYLENE-ENCAPSULATED PRODUCT AND METHOD OF MAKING SAME

Burton P. Brodt, Louisville, Ky., and Stanley G. Smith, Brandywine Hundred, Del., assignors to E. I. du Pont de Nemours and Company, Wilmington, Del., a corporation of Delaware
No Drawing. Filed July 18, 1961, Ser. No. 124,785
13 Claims. (Cl. 260—79.5)

This invention relates to a novel process for the encapsulation of chemical compounds. More particularly this invention relates to the preparation of delayed-action elastomer processing agents and their compositions.

For convenience of the user, it is sometimes desirable to prepare an uncured elastomer containing processing agents which are inert during handling and storage but which are readily reactivated without loss of effectiveness at the desired time. In order to do this, suitable means must be used to inactivate the processing agent from the time of its incorporation into the polymer until the time that curing is to take place.

It is an object of this invention to provide a novel process for the preparation of delayed-action elastomer processing agents (i.e., an elastomer processing agent in a deactivated form). A still further object is to provide new compositions of elastomer processing agents and a coating material. Other objects will appear hereinafter.

These and other objects of this invention are accomplished by incorporating an elastomer processing agent into a polyethylene matrix, pulverizing the composition to a desired size, washing with a solvent to remove exposed processing agent, and collecting the pulverized material.

The preparation of a pulverulent material suitable for incorporation into elastomers, which material will be inactive in the elastomer at temperatures below about 99° C. but which will become available for action on the elastomer at temperatures in excess of 99° C., comprises the following steps; dispersing 20 to 70 percent, by weight, based on total weight of the composition, of a powdered material selected from the group consisting of 2-mercapto-2-imidazoline, 1,3-diethyl-2-thiourea, sulfur, pyrogallol, and catechol, into a molten polyethylene having a melting point in the range of about 99° C. to about 135° C., an average molecular weight of from about 1500 to about 5000, and a viscosity at 140° C. of not over 300 centipoises; freezing the resulting material; comminuting the solidified composition to an average particle diameter of at least 7 times larger than the average particle diameter of the original powdered material; treating the comminuted composition with a solvent in which the original powdered material is soluble but in which the polyethylene is insoluble; and removing the solvent from the comminuted material.

For convenience, the preparation of the powdered materials of this invention as described above will be referred to as "encapsulation." By this term is meant that the particles of processing agent are completely contained within the polyethylene matrix and that no portion of the processing agent is exposed on the surface of the matrix.

The processing agents which can be successfully encapsulated by the process of this invention are those listed above. They should be in powder form at the time they are encapsulated.

The polyethylenes which can be used are the waxy polymers of ethylene having a molecular weight from about 1500 to about 5000, a melting point in the range of about 99° C. to about 135° C., and a viscosity at 140° C. of not over 300 centipoises. These waxy polyethylenes are known compositions which are commercially available. If the polyethylene melts below about 99° C., it is difficult to incorporate the final encapsulated powder into an elastomer without melting the polyethylene. If the polyethylene melts above about 135° C., the encapsulated compounding agent does not become sufficiently available during the processing step. If the molten polyethylene has a viscosity above about 300 centipoises at 140° C., it is too difficult to disperse the processing agent uniformly into the molten polyethylene.

The processing agent should be dispersed into the molten polyethylene in a proportion of 20–70 percent by weight, based on the total weight of the composition. If more than 70 percent of the processing agent is used, there is not enough polyethylene present to afford effective encapsulation. On the other hand, if less than 20 percent of the processing agent is used, the final material will contain an excessive amount of the polyethylene in proportion to the active processing agent. This may adversely affect the properties of the final vulcanizate and makes it difficult to effect intimate contact of the processing agent with the elastomer.

The powdered processing agent should be uniformly dispersed in the molten polyethylene using conventional methods. The composition is then allowed to harden and upon solidification is comminuted to an average particle size at least 7 times larger than the average particle size of the original powdered processing agent. Comminution may be accomplished by any standard method. It is helpful to add solid carbon dioxide to the polyethylene during grinding to make the polyethylene more brittle. Alternatively, solidification and comminution may be accomplished simultaneously, for example, by conventional spray freezing techniques. It is sometimes necessary to further comminute the particles produced by spray freezing.

If the final particle diameter of the comminuted composition is less than about 7 times larger than the average particle diameter of original powdered processing agent, too little of the processing agent will be completely enclosed within the matrix to be effective during the curing step. While the upper limit of the final particle diameter is not critical, it is preferred that it should not be more than 30 times that of the original powdered agent. If the final particle diameter is larger than this, it becomes difficult to effect intimate dispersion of the processing agent into the elastomer during the processing step.

After the particles of matrix containing the processing agent have been comminuted, they must be washed with a solvent which will dissolve any uncoated particles of processing agent and any particles of processing agent exposed on the surface of the matrix. The solvent most suitable for use will depend on the particular processing agent being encapsulated. Water, methanol, and ethanol are suitable in the case of 2-mercapto-2-imidazoline, 1,3-diethyl-2-thiourea, pyrogallol, and catechol. Water is the preferred solvent. If desired, the water may be made slightly alkaline to improve its solvent effect. In the case of sulfur, acetone is the preferred solvent. Also, the comminuted material may be treated successively with different solvents or with mixed solvents, such as alcohol-water mixtures.

The comminuted particles should be thoroughly exposed to the solvent by any convenient method. The quantity of solvent is not critical; the only requirement is that sufficient solvent be used to completely dissolve the exposed processing agent. After treatment of the particles with the solvent, the solvent is removed from the particles by any convenient method, such as by filtration followed by evaporation of residual solvent.

The encapsulated particles are suitable for incorporation into elastomeric compositions by any method which does not fracture or melt the polyethylene matrix surrounding the particles of processing agent. One particularly suitable method is to incorporate the encapsulated particles into the elastomer latex and then to spray dry the resulting mixture. Another method is to mix the encapsulated particles with finely divided particles of solid elastomer. Elastomers in powder form are available commercially. These elastomers may be prepared by well-known methods such as by spray drying the elastomer latex, by coagulating the latex in the form of small crumbs, or by grinding the solid polymer at low temperatures.

Example 1 illustrates the use of the encapsulated materials in polychloroprene; however, they may also be used in other synthetic elastomers or in natural rubber. They may be used with other compounding ingredients commonly used in the preparation of cured elastomers. These include such materials as clay, carbon black, metal oxides, and plasticizers. These compounding agents may be added to the elastomeric composition either before or after the addition of the encapsulated materials. However, if the encapsulated materials are present, it is important that mixing be accomplished by a method which will not fracture the encapsulating material. One convenient method is to mix the materials together in a blendor or tumbling mixer.

The following examples will better illustrate the nature of the present invention; however, the invention is not intended to be limited to these examples. Parts are by weight unless otherwise indicated.

*Example 1*

A. Two hundred grams of polyethylene having a melting point of 104–108° C., a molecular weight of about 2,000 and a viscosity at 140° C. of 180 cps., are melted in a beaker on a hot plate. Two hundred grams of powdered 2-mercapto-2-imidazoline having an average particle diameter of 10 microns are added and thoroughly dispersed in the molten polyethylene by vigorous mechanical agitation. The mixture is poured onto heavy waxed paper and allowed to solidify. The resulting slab is broken into coarse pieces and ground with a mortar and pestle. Solid carbon dioxide is mixed with the material being ground to render the soft polyethylene more brittle. The powder is classified in Taylor sieves and those particles having diameters between 175 and 248 microns are retained. This powder has a content of 46.6 weight percent of 2-mercapto-2-imidazoline (determined by analysis for sulfur by the Parr bomb method). Ten grams of the powdered material are placed in 2 liters of water at about 50° C. and stirred for 15 minutes, during which time exposed accelerator is dissolved in the water. The remaining particles are removed by filtration and dried in a vacuum oven at 50° C. for 2 hours. After washing, the powder has essentially the same particle diameter as before washing. The content of 2-mercapto-2-imidazoline is 19.9%.

B. A polychloroprene latex is prepared as described in Example 1 of U.S. Patent 2,868,764. A powdered compounded stock is prepared by spray drying the latex with the following, per 100 parts of solid polychloroprene, by weight:

| | Parts |
|---|---|
| N-phenyl-2-naphthylamine | 2 |
| Magnesium oxide | 4 |
| Medium abrasion furnace black | 15 |
| Clay | 120 |
| Light process oil | 15 |
| Petroleum wax | 4 |
| Zinc oxide | 5 |

Two hundred grams of this powdered compounded polychloroprene are mixed with 0.302 gram of 2-mercapto-2-imidazoline and 1.216 grams of powdered polyethylene by shaking the powders together in a large jar (Batch A). Another 200 grams of the powdered polychloroprene are mixed with 1.518 grams of the powder prepared in paragraph A (Batch B). Sixty-gram portions of each batch are placed in a mold one inch in diameter. This is heated to 85° C. and pressed in a manually operated hydraulic press at 20,000 p.s.i.g. for 1 minute. This procedure masses the powder to a solid pellet. These pellets are aged in an oven at 70° C. for 3 days. For comparison, a pellet is prepared in a similar way using the powdered polychloroprene stock with no accelerator or polyethylene added (Batch C).

As a test of the degree of vulcanization, the extrusion time of each batch is measured as follows:

Each pellet is heated to 85° C. and extruded at 10 p.s.i.g. using a Firestone Plastometer. The extrusion times for each of these batches are as follows.

| | Seconds |
|---|---|
| Batch A | 222 |
| Batch B | 56 |
| Batch C | 59 |

From these data it is evident that the polychloroprene stock containing the encapsulated 2-mercapto-2-imidazoline (Batch B, an accelerator for the vulcanization of polychloroprene) behaves essentially the same as polychloroprene stock containing no accelerator. On the other hand, the polychloroprene stock (Batch A) containing unencapsultaed accelerator shows a significant degree of vulcanization.

Additional portions of the unaged Batches A and B are massed on a two-roll mill. Separate samples of each batch are cured in a mold in a press at 153° C. for 30 minutes. The tensile properties of the cured samples, measured at 24° C. by ASTM Method D412–51T, are:

| | A | B |
|---|---|---|
| Modulus at 300% elongation, p.s.i. | 925 | 875 |
| Tensile strength at the break, p.s.i. | 1,525 | 1,650 |
| Elongation at the break, percent | 530 | 550 |

From this data it is apparent that the encapsulated accelerator becomes available to accelerate the vulcanization of polychloroprene when the composition is heated above the melting point of the polyethylene.

Two hundred grams of the powdered compounded polychloroprene stock of Paragraph B are mixed with 0.302 gram of 2-mercapto-2-imidazoline and 0.346 gram of powdered polyethylene (Batch D). Another 200 grams of the compounded polychloroprene stock is mixed with 0.648 gram of the powder prepared in Paragraph A after it has been comminuted but before it has been washed with the solvent (Batch E). A pellet is prepared from each of these mixtures in the same way as described above. These pellets are aged in an oven at 70° C. for 3 days. The extrusion time of each composition is measured, as described above. The results are:

| | Extrusion time seconds |
|---|---|
| Batch D | 104 |
| Batch E | 98 |

From this it can be seen that unless the encapsulated, comminuted material is washed to remove exposed accelerator, there is no significant protection against premature vulcanization.

*Example 2*

Fifty grams of polyethylene of the same type as used in Example 1 are melted in a beaker, and fifty grams of sulfur having an average particle diameter of about 10 microns are dispersed in the melt. The mixture is allowed to freeze and is ground in a mortar with solid carbon dioxide to a particle diameter in the range of 70 to 175 microns. The resulting powder has a sulfur content of 52.88% (determined by the Parr bomb method). Twenty grams of the powder are dispersed in 1000 grams of acetone and stirred vigorously for 15 minutes. The undissolved particles are removed by filtration and dried in a vacuum oven for 1 hour. The resulting powder has a sulfur content of 50.85%. On treatment with additional acetone the particles lose no further weight.

When the powdered encapsulated sulfur is added, along with the powdered, encapsultaed 2-mercapto-2-imidazoline of Example 1, to the compounded polychloroprene of Example 1, the elastomer is protected from the action of both the sulfur and the 2-mercapto-2-imidazoline until the compounded material is milled and heated.

*Example 3*

One hundred grams of polyethylene having a melting point of 99°–103° C., an average molecular weight of 1,500, and a viscosity at 140° C. of 100 cps. are melted and 100 grams of 1,3-diethyl-2-thiourea are dispersed in the melt. Upon being mixed with the molten polyethylene, the diethylthiourea melts and is broken mechanically into droplets in the range of 50–100 microns in diameter. The molten composition is simultaneously frozen and comminuted by spraying it with compressed air from a paint spray gun. The resulting particles, which have a particle diameter of approximately 1500 microns, are collected from an impingement surface. Twenty grams of the powder are washed with 2000 ml. of water. The undissolved particles are removed by filtration and dried in an oven at 50° C. for 4 hours. The resulting composition has an accelerator content of 11.5% (determined by the Parr bomb method) and undergoes no further loss in weight on treatment with additional amounts of water.

When the powdered encapsulated composition is incorporated into compounded polychloroprene as described in Example 1, paragraph B, the elastomer is protected from the action of the accelerator until the composition is milled and heated.

*Example 4*

One hundred grams of polyethylene of the same type used in Example 3 are melted in a beaker on a hot plate, and 100 grams of catechol having an average particle diameter of about 190 microns are dispersed in the melt. The molten composition is spray frozen by the method used in Example 3. The final particles have a particle diameter of about 1500 microns. Six grams of these particles are washed with 150 ml. of a 5 percent solution of sodium hydroxide in water. The particles are removed by filtration and washed with 100 ml. of a 10 percent solution of methanol in water. The particles are separated from the solvent by filtration and are dried in an oven for 2 hours at 50° C. The resulting composition has a catechol content of 39 percent. On further treatment with water it undergoes no loss in weight.

When the powdered encapsulated composition is incorporated into compounded polychloroprene, the elastomer is protected from the action of the accelerator until the composition is milled and heated.

*Example 5*

One hundred grams of polyethylene of the same type as was used in Example 3 are melted in a beaker on a hot plate. Fifty grams of pyrogallol having a particle diameter of about 190 microns are dispersed in the melt. The molten composition is spray frozen by the method of Example 3. The spray frozen particles have a particle diameter of about 1500 microns. Three grams of the recovered particles are washed with 200 ml. of water. The particles are separated from the water by filtration and washed with 100 ml. of methanol. The particles are refiltered and are dried in an oven at 50° C. for one hour. The resulting composition has an accelerator content of 14.4 percent and shows no further loss of weight on treatment with water.

When the powdered encapsulated composition is incorporated into compounded polychloroprene, the elastomer is protected from the action of the accelerator until the composition is milled and heated.

As many apparently widely different embodiments of this invention may be made without departing from the spirit and scope thereof, it is to be understood that this invention is not limited to the specific embodiments thereof except as defined in the appended claims.

The embodiments of this invention in which an exclusive property or privilege is claimed are defined as follows:

1. A process for the preparation of delayed-action elastomer processing agents comprising the steps of dispersing 20 to 70 percent by weight based on the total weight of the composition of a powdered material selected from the group consisting of 2-mercapto-2-imidazoline, 1,3-diethyl-2-thiourea, sulfur, pyrogallol, and catechol in molten polyethylene having a melting point of from about 99° C. to about 135° C. and a viscosity at 140° C. of no greater than 300 centipoises; freezing the resulting composition, comminuting said solidified composition to an average particle size of at least 7 times larger than the average particle diameter of said powdered material; washing said comminuted composition with a solvent in which said powdered material is soluble and said polyethylene is insoluble; and removing said solvent from said comminuted composition.

2. A process as described in claim 1 wherein said composition is comminuted to an average particle size of at least 7 times to no greater than 30 times larger than the average particle diameter of said powdered material.

3. A process as described in claim 1 wherein said powdered material is 2-mercapto-2-imidazoline.

4. A process as described in claim 1 wherein said powdered material is sulfur.

5. A process as described in claim 1 wherein said powdered material is 1,3-diethyl-2-thiourea.

6. A process as described in claim 1 wherein said powdered material is catechol.

7. A process as described in claim 1 wherein said powdered material is pyrogallol.

8. A delayed-action, elastomer processing agent composition comprising particles of a polyethylene matrix containing therein an elastomer processing agent selected from the group consisting of 2-mercapto-2-imidazoline, 1,3-diethyl-2-thiourea, sulfur, catechol, and pyrogallol, encapsulated in polyethylene having a melting point of from about 99° C. to about 135° C. and a viscosity at 140° C. of no greater than 300 centipoises, said encapsulated particles having an average particle size of at least 7 times larger than the average particle diameter of the processing agent before encapsulation.

9. A composition as defined in claim 8 wherein said processing agent is 2-mercapto-2-imidazoline.

10. A composition as defined in claim 8 wherein said processing agent is 1,3-diethyl-2-thiourea.

11. A composition as defined in claim 8 wherein said processing agent is sulfur.

12. A composition as defined in claim 8 wherein said processing agent is catechol.

13. A composition as defined in claim 8 wherein said processing agent is pyrogallol.

References Cited by the Examiner

UNITED STATES PATENTS

| | | | |
|---|---|---|---|
| 2,617,775 | 11/52 | Newberg et al. | 260—4 |
| 2,617,782 | 11/52 | Paton et al. | 260—4 |
| 2,653,924 | 9/53 | Olin | 260—79.5 |
| 2,653,925 | 9/53 | Olin | 260—79.5 |
| 3,092,438 | 6/63 | Kruger | 117—100 |

LEON J. BERCOVITZ, *Primary Examiner.*

WILLIAM H. SHORT, *Examiner.*